United States Patent [19]

Winslow et al.

[11] Patent Number: 4,700,935
[45] Date of Patent: Oct. 20, 1987

[54] FIXTURE FOR WAVE SOLDERING PACKAGED INTEGRATED CIRCUITS

[76] Inventors: Russell T. Winslow, 4075 Laguna Way, Palo Alto, Calif. 94306; Thomas M. Goida, 460 Dempsey Rd., #263, Milpitas, Calif. 95035

[21] Appl. No.: 827,835

[22] Filed: Feb. 7, 1986

[51] Int. Cl.⁴ .............................................. B23Q 3/00
[52] U.S. Cl. .............................. 269/126; 269/254 R; 269/296; 269/903
[58] Field of Search ............... 269/126–129, 269/135, 296–299, 903, 254 R, 43–44, 303; 211/41, 83, 84; 248/505, 500, 503; 29/760; 228/36, 37; 206/334, 328, 478, 591; 229/2.5 EC

[56] References Cited

U.S. PATENT DOCUMENTS

| | | | |
|---|---|---|---|
| 1,746,529 | 2/1930 | Haines | 269/128 |
| 2,542,640 | 2/1951 | Dixon | 206/478 |
| 2,919,046 | 12/1959 | Parsons | 206/591 |
| 3,605,999 | 9/1971 | Coon | . |
| 3,783,499 | 1/1974 | Hughes et al. | . |
| 4,071,944 | 2/1978 | Chauss et al. | . |
| 4,121,816 | 10/1978 | Eads | 269/296 |
| 4,157,757 | 6/1979 | Gallagher | 206/328 |
| 4,175,728 | 11/1979 | Ferguson | 269/254 R |
| 4,241,829 | 12/1980 | Hardy | 206/591 |
| 4,333,565 | 6/1982 | Woods | 206/591 |
| 4,489,923 | 12/1984 | Barresi et al. | . |
| 4,545,761 | 10/1985 | Cartwright et al. | 269/254 R |
| 4,570,915 | 2/1986 | O'Hern | 269/296 |
| 4,592,468 | 6/1986 | Wallace | 206/523 |
| 4,602,715 | 7/1986 | Sarver et al. | 206/591 |
| 4,609,141 | 9/1986 | Lake | 206/523 |

OTHER PUBLICATIONS

IBM Technical Disclosure Bulletin, "Wafer Package", L. Hershoff, vol. 8, No. 11, Apr. 1966.
IBM Technical Disclosure Bulletin, "Integrated Circuit Container", Capousis et al, vol. 17, No. 11, Mar. 1975.
Western Electric Technical Digest, "Integrated Circuit Shipping Package", Egan et al, No. 30, Apr. 1973.

Primary Examiner—Robert C. Watson
Attorney, Agent, or Firm—Flehr, Hohbach, Test, Albritton & Herbert

[57] ABSTRACT

A fixture for supporting integrated circuit packages during wave soldering of leads on the packages includes a carrier portion including two sets of orthogonal support members. The support members have formed edges for defining seats for receiving the packages. A frame cover includes appendages for engaging the packages and maintaining the packages in the seats. The arrangement of the orthogonal support members and cover appendages facilitates solder wave access to all leads of the packages and cleaning and drying of the packages. Heat transfer from the molten solder during the wave soldering procedure is minimized due to the low mass of the cover appendages.

5 Claims, 9 Drawing Figures

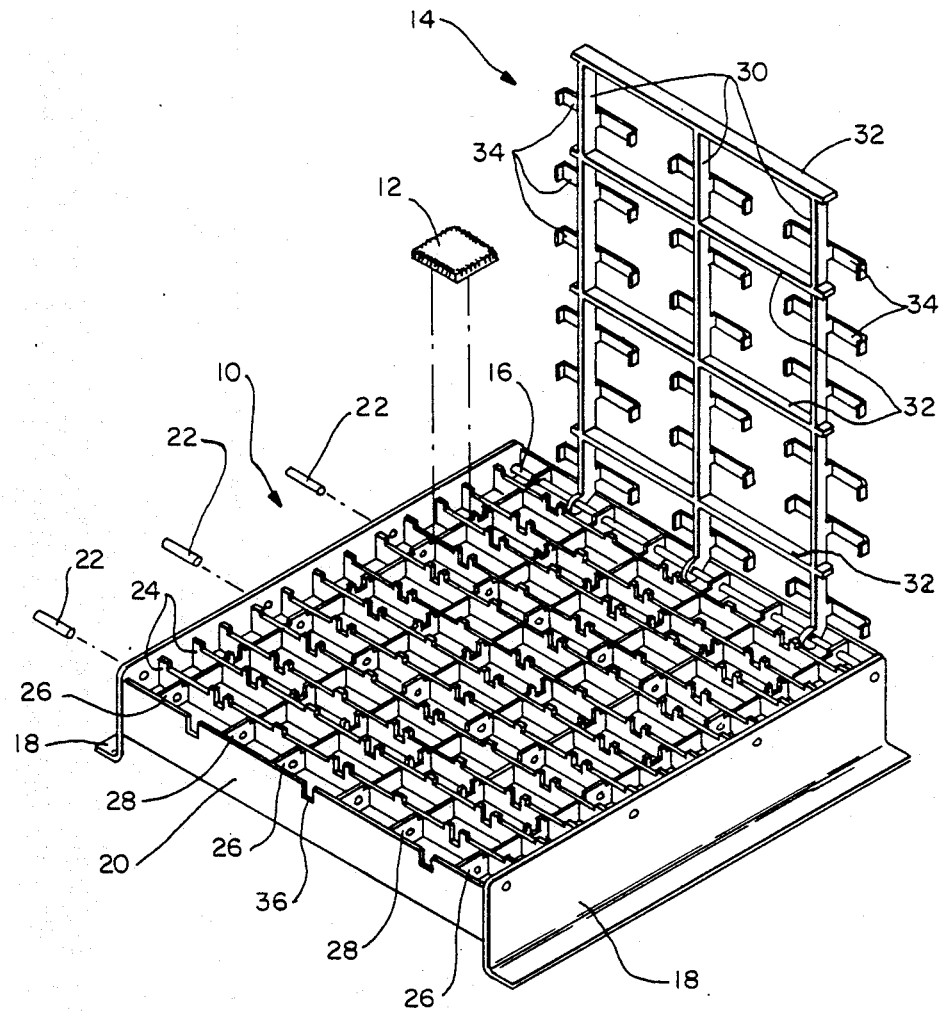
FIG.—1

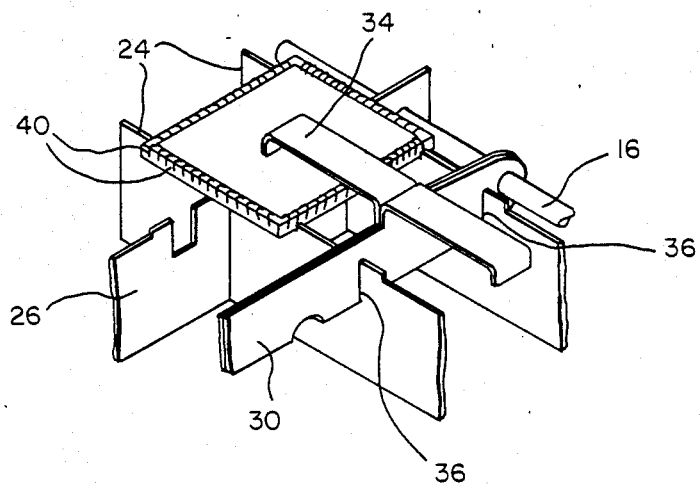
FIG.—2
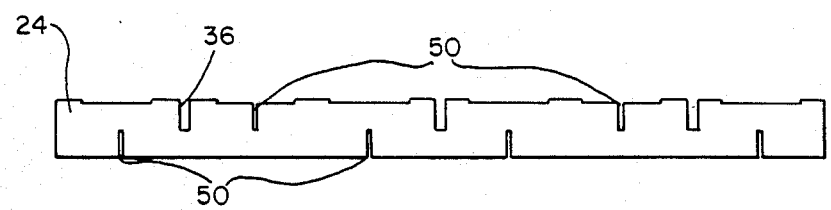
FIG.—3
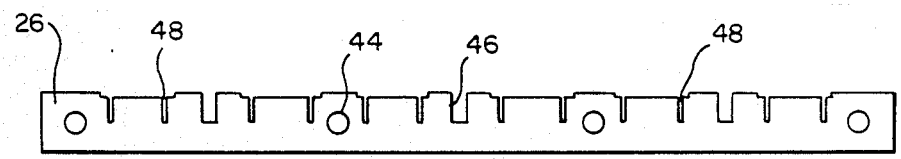
FIG.—4
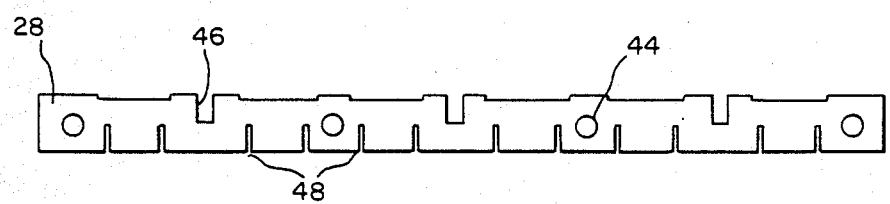
FIG.—5

FIXTURE FOR WAVE SOLDERING PACKAGED INTEGRATED CIRCUITS

This invention relates generally to fixtures for use in manufacturing semiconductor integrated circuits, and ore particularly the invention relates to a fixture for use in wave soldering leads of a packaged integrated circuit.

Many semiconductor integrated ciruits are now packaged in what are termed "high density" packages such as plastic leaded chip carriers (PLCCs), flat packs, and pin grid arrays (PGAs). These packages differ from conventional dual-in-line packages (DIPs) in that they have protruding electrical leads on four sides of the package rather than two. These leads are arranged in either rows (PLCCs & flat packs) or an array (PGAs).

In order to facilitate the soldering of such integrated circuit packages to printed circuit boards, solder is applied to the leads prior to assembly of the package to a board. This is typically accomplished by wave soldering. To wave solder a batch of packages they are loaded into a fixture. After loading the packages integrated circuits into the fixture, the fixture is then placed into the wave solder machine. A typical sequence of operations in the wave solder machine include an acid "pre-clean", fluxing, preheating, soldering, cleaning, and drying. Once these are completed the fixture is then removed from the wave solder machine and the packages are removed from the fixture completing the process.

Prior art wave soldering fixtures for high density packages typically retain the packages in or between surfaces of two supporting metal plates. This technique has a number of disadvantages attributable to the high mass and large surface area of the supporting plates. First, preheating of the package leads is hindered by the mass of the plates absorbing the energy of the preheat. Poor preheating can cause defects such as solder bridging or solder bumps. Second, free access to the package leads for soldering and cleaning is limited due to the plate configurations. Defects related to this include nonwetting (non-soldering) of leads and potential failure to meet component "cleanliness" requirements due to remaining chemical residues. Attempts at overcoming these limitations include the use of adhesive and magnetic package holders. See for example, U.S. Pat. Nos. 4,489,923, 4,071,944, 3,783,499, and 3,605,999.

The present invention is directed to an improved fixture for use in wave soldering high density packages which does not utilize supporting metallized plates, adhesives, or magnetism for retention of the packages. The invention has a number of advantages over prior art fixtures. First, the fixture can be used for a variety of high density packages, while the magnetic fixture (U.S. Pat. No. 4,489,923) can only be used with packages containing ferrous metals such as lead-less chip carriers (LCCs). Second, only a limited portion of the fixture is immersed into the solder, providing free solder wave access to all leads of the package. Third, the overall mass of the fixture is minimal, assuring adequate preheat of the packages and minimal heat loss from the solder when the fixture contacts the wave. Fourth, the fixture is geometrically arranged to facilitate cleaning and drying of the packages. Fifth, packages are physically retained in the fixture, ensuring that they will not be dislodged. Sixth, the formed edges of the support members guide the package as it is being loaded into its seat, thereby increasing the reliability of automated processing.

In accordance with the invention a plurality of generally rectangular support members are orthogonally arranged with edges of the support members formed to define seats for receiving integrated circuit packages. By so placing the packages on the edges of the support members, free solder wave access to the leads is ensured. Additionally, this arrangement provides excellent passage of air and water through the fixture thereby facilitating cleaning and drying of the packages.

A frame cover is received by the support members with the frame cover having appendages for contacting the integrated circuit packages and retaining them in the seats. During the wave soldering of the leads, only the appendage portions of the frame cover are immersed in the solder wave. Advantageously, the mass of the appendages is minimal thereby reducing heat loss from the solder pool.

In a preferred embodiment, the orthogonal support members are slotted with one set of parallel support members having slots on opposing edges for selectively engaging the other set of parallel support members from opposing sides. The support members then become interlocked when assembled.

In a preferred embodiment the frame cover is pivotally attached to the interlocked support members. The appendages can be integral with the frame cover material or can be formed rods attached to the frame cover.

The invention and objects and features thereof will be more readily apparent from the following detailed description and appended claims when taken with the drawing, in which:

FIG. 1 is a perspective view of a wave soldering fixture in accordance with one embodiment of the invention.

FIG. 2 is a perspective view of a portion of the fixture of FIG. 1 showing the positioning of an integrated circuit package (PLCC) therein.

FIGS. 3–5 are front elevation view of support members in the fixture of FIG. 1.

Figure 6:
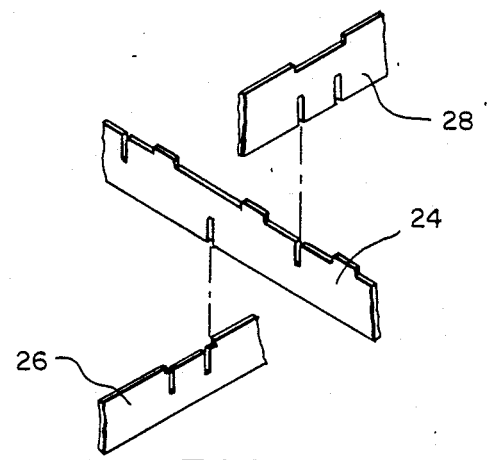
FIG. 6 is an exploded perspective view of the support members of FIGS. 3–5 and illustrating the assembly thereof.

Referring now to the drawings, FIG. 1 is a perspective view of a fixture for wave soldering in accordance with one embodiment of the invention. The fixture comprises a bottom seat portion shown generally at 10 for receiving integrated circuit packages, such as PLCC package 12, and a frame cover 14 for retaining the packages 12 in the seat portion 10. In this embodiment the cover portion 14 comprises a frame which is pivotally attached to rod 16 in the seat portion 10.

Seat portion 10 is mounted in a frame comprising opposing sidewalls 18 and opposing front and back walls such as front wall 20. As will be described hereinbelow, the seat portion is mounted to the frame by means of rods 22 which extend through the sidewalls 18 and support members of the seat 10.

The seat portion 10 comprises two sets of generally planar support members. A first set of support members 24 are arranged in parallel and extend from one side to the other side of the fixture. The other set of support members comprises a plurality of support members 26 and 28 which are similar in configuration except for the reception thereof of the first plurality of support members 24. The two sets of support members are orthogonally arranged with the top edges of the support members formed to define seats for receiving the integrated circuit packages.

The frame cover 14 comprises a plurality of bars 30 which are configured to run the length of fixture 10. The arms 30 are joined by cross members 32. Extending from the arms 30 are a plurality of appendages 34 which engage the integrated circuit packages in the fixture 10 to retain the packages in their respective seats when the frame 14 is pivoted into engagement with the top of the seat portion 10. The arms 30 are received by notches 36 in the front panel 20 and in the support members 24. Similarly, the cross members 32 are received in notches in support members 26, 28.

FIG. 2 is a perspective view of a portion of the fixture of FIG. 1 showing the package 12 positioned in a seat defined by the formed edge portions of support members 24 and 26. The arm 30 is received in notices 36 of the support members 24 with the appendage 34 engaging package 12 for maintaining the package in the defined seat. During the wave soldering process, the fixture is turned upside down whereby the leads 40 around the periphery of the package 22 can be immersed in the wave solder. Advantageously, only the appendages of the frame cover 14 of the fixture are emersed in the solder thereby minimizing heat transfer therefrom. The positioning of the packages on the formed edges of the support members 24, 26 facilitates the passage of air and water around the packages and through the fixture during the cleaning and drying procedures.

FIGS. 3-5 are side elevation views of the support members 24, 26 and 28, respectively. The top edges of the support members are formed or machined to define seats for receiving the packages 12. Members 26 and 28 include holes 44 for receiving the rods 22 of FIG. 1 and the top edges are provided with notches 46 for receiving the cross members 32 of the frame cover 14. The top edge of support member 24 includes the notches 36 for receiving the support arms 30 of the frame cover 14.

It will be noted that support member 26 has a plurality of slots 48 extending downward from the top edge to the middle of the member, whereas support member 28 is provided with slots 48 which extend from the bottom edge to the middle of the member. Accordingly, the orthogonal set of support members 24 are received from opposing sides of the support members 26 and 28. This is illustrated in the exploded perspective view of the support members in FIG. 6. The support members 24 are provided with slots 50 on opposing edges of the members. The slots in support members 26 and 28 receive the slots in the support member 24 whereby the support members become interlocked and assembled. The arrangement of slots in support member 24 indicates that four support members 26 and two support members 28 form one set of parallel support members, and twelve support members 24 form the other set of parallel support members, as shown in FIG. 1. The rods 22 which extend through the support members 26, 28 are sufficient to maintain the interlocking of the assembly.

Figure 7:
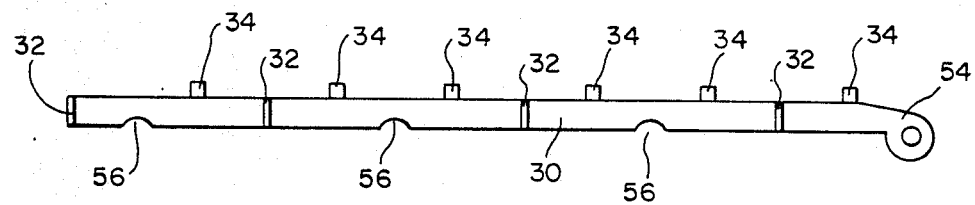
FIGS. 7 and 8 are a side elevation and front elevation, respectively, of the frame cover for the fixture of FIG. 1.

FIG. 7 is a side elevation of the frame cover 14 and further illustrates the positions of the appendages 34 on the top of arm 30. The end 54 of arm 30 is formed with a hole therethrough for receiving the rod 16 of FIG. 1.

Figure 8:
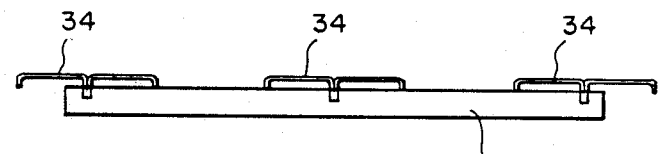

The bottom edge of arm 30 is notched at 56 to reduce the mass of the cover which is emersed in the molten solder. FIG. 8 is a front elevation of the frame cover 14 and further illustrates the positioning of the appendages 34.

Figure 9:
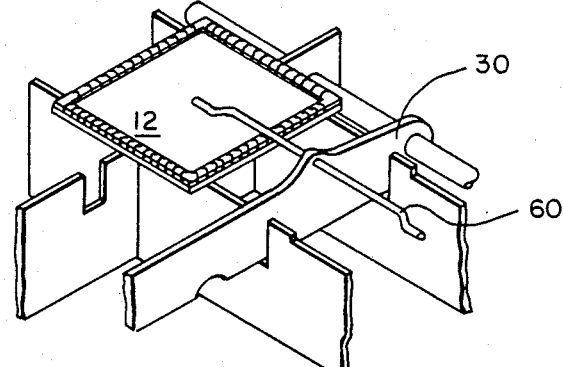
FIG. 9 is a perspective view of a portion of a fixture in accordance with another embodiment of the invention.

FIG. 9 is a perspective view of a portion of a fixture in accordance with an alternative embodiment. In this embodiment the appendages comprise rods such as rod 60 which is mounted through and welded to the support arm 30 of the frame cover. Either end of the rod 60 is formed to engage the integrated circuit package 12 as shown. The rod appendages have proved to eliminate any solder bridging between leads which can occasionally occur with the integral appendages.

As in conventional wave soldering fixtures, the fixture is preferably made of titanium material. The cross arms and support arms of the frame cover 14 are preferably welded together, whereas the support members of the seat portion 10 form an interlocking assembly by means of the engaging slots in the edges thereof.

A wave soldering fixture in accordance with the invention facilitates the cleaning and drying of integrated circuit packages and the fixture due to the vertical arrangement of the support members of the seat. Since only the appendages of the frame cover are immersed in the molten solder, heat loss from the molten solder is reduced. The fixture has proved to be particularly advantageous for use in the wave soldering of PLCC integrated circuit packages.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A fixture for supporting packages during wave soldering of leads on the packages comprising
   a carrier portion including two sets of orthogonal support members, said orthogonal support members having formed edges defining seats for receiving the packages, and
   a frame cover pivotally attached to said carrier portion for retaining packages in said seats when said fixture is turned upside down, said frame cover including appendages extending therefrom for engaging packages,
   said support members having notches in said edges for receiving said frame cover.

2. The fixture as defined in claim 1 wherein edges of said support members include slots whereby said slots of said two orthogonal support members are engaged.

3. The fixture as defined in claim 2 wherein said slots are selectively positioned in opposing edges of at least one set of said support members whereby said orthogonal support members form an interlocked assembly.

4. The fixture as defined in claim 3 wherein at least one set of support member includes holes therethrough, said fixture further including rods extending through said holes for maintaining said orthogonal support member in position.

5. The fixture as defined in claim 4 and further including a support frame around said carrier portion, said rods extending through said support frame.

* * * * *